US011890795B2

(12) United States Patent
Teramoto

(10) Patent No.: US 11,890,795 B2
(45) Date of Patent: Feb. 6, 2024

(54) PLASTICIZING DEVICE, THREE-DIMENSIONAL MODELING DEVICE, AND INJECTION MOLDING DEVICE

(71) Applicant: SEIKO EPSON CORPORATION, Tokyo (JP)

(72) Inventor: Tatsuya Teramoto, Shiojiri (JP)

(73) Assignee: SEIKO EPSON CORPORATION

(*) Notice: Subject to any disclaimer, the term of this patent is extended or adjusted under 35 U.S.C. 154(b) by 0 days.

(21) Appl. No.: 17/948,430

(22) Filed: Sep. 20, 2022

(65) Prior Publication Data

US 2023/0089600 A1    Mar. 23, 2023

(30) Foreign Application Priority Data

Sep. 21, 2021    (JP) .................................. 2021-152991

(51) Int. Cl.
| | |
|---|---|
| B29C 45/18 | (2006.01) |
| B29C 64/321 | (2017.01) |
| B33Y 30/00 | (2015.01) |
| B29C 45/60 | (2006.01) |
| B29C 64/314 | (2017.01) |
| B29C 64/255 | (2017.01) |
| B29C 64/209 | (2017.01) |

(52) U.S. Cl.
CPC .............. B29C 45/60 (2013.01); B29C 45/18 (2013.01); B29C 64/209 (2017.08); B29C 64/255 (2017.08); B29C 64/314 (2017.08); B33Y 30/00 (2014.12)

(58) Field of Classification Search
None
See application file for complete search history.

(56) References Cited

U.S. PATENT DOCUMENTS

2007/0026096 A1* 2/2007 Takatsugi ................ B29C 45/18
425/587

FOREIGN PATENT DOCUMENTS

| JP | 2005047050 A | * | 2/2005 |
| JP | 2010-241016 A |   | 10/2010 |

* cited by examiner

*Primary Examiner* — Armand Melendez
(74) *Attorney, Agent, or Firm* — Harness, Dickey & Pierce, P.L.C.

(57) ABSTRACT

A plasticizing device includes a material reservoir which has an input port and is configured to retain a material, a plasticizer which has a screw and a case housing the screw and provided with a feed port communicated with the input port, and which is configured to plasticize the material to generate a plasticized material, a coupling pipe having a coupling path configured to connect the input port and the feed port to each other, a material sensor which has a light emitter configured to emit light toward the screw via the feed port, and a light receiver configured to receive reflected light of the light, and which is configured to detect a remaining amount of the material, and a controller configured to control the material reservoir, wherein the material reservoir has a material feed mechanism configured to feed the material to the coupling path, and the controller controls the material feed mechanism to feed the material to the coupling path when the remaining amount of the material detected by the material sensor is smaller than a reference value.

7 Claims, 7 Drawing Sheets

PLASTICIZING DEVICE, THREE-DIMENSIONAL MODELING DEVICE, AND INJECTION MOLDING DEVICE

The present application is based on, and claims priority from JP Application Serial Number 2021-152991, filed Sep. 21, 2021, the disclosure of which is hereby incorporated by reference herein in its entirety.

BACKGROUND

1. Technical Field

The present disclosure relates to a plasticizing device, a three-dimensional modeling device, and an injection molding device.

2. Related Art

There has been known an injection molding device which ejects a material plasticized by a plasticizing device toward a cavity of a molding die, and then harden the material to thereby form a molded object.

In, for example, JP-A-2010-241016, there is described an injection molding device equipped with a plasticizing delivery device provided with a barrel, a rotor, and a spiral groove, wherein a material inflow path opens on one end surface of the barrel, the rotor has an end surface having sliding contact with the one end surface of the barrel, and the spiral groove is formed on an end surface of the rotor.

In such a plasticizing device as described above, the material gets stuck in the vicinity of a feed port for feed the rotor with the material, the material fails to be fed to the rotor, and stable plasticization cannot be achieved in some cases.

SUMMARY

A plasticizing device according to an aspect of the present disclosure includes a material reservoir which has an input port and is configured to retain a material, a plasticizer which has a screw and a case housing the screw and provided with a feed port communicated with the input port, and which is configured to plasticize the material to generate a plasticized material, a coupling pipe having a coupling path configured to connect the input port and the feed port to each other, a material sensor which has a light emitter configured to emit light toward the screw via the feed port, and a light receiver configured to receive reflected light of the light, and which is configured to detect a remaining amount of the material, and a controller configured to control the material reservoir, wherein the material reservoir has a material feed mechanism configured to feed the material to the coupling path, and the controller controls the material feed mechanism to feed the material to the coupling path when the remaining amount of the material detected by the material sensor is smaller than a reference value.

A three-dimensional modeling device according to an aspect of the present disclosure includes a plasticizing device configured to plasticize a material to generate a plasticized material, and a nozzle configured to eject the plasticized material fed from the plasticizing device toward a stage, wherein the plasticizing device includes a material reservoir which has an input port and is configured to retain the material, a plasticizer which has a screw and a case housing the screw and provided with a feed port communicated with the input port, and which is configured to plasticize the material to generate the plasticized material, a coupling pipe having a coupling path configured to connect the input port and the feed port to each other, a material sensor which has a light emitter configured to emit light toward the screw via the feed port, and a light receiver configured to receive reflected light of the light, and which is configured to detect a remaining amount of the material, and a controller configured to control the material reservoir, the material reservoir has a material feed mechanism configured to feed the material to the coupling path, and the controller controls the material feed mechanism to feed the material to the coupling path when the remaining amount of the material detected by the material sensor is smaller than a reference value.

An injection molding device according to an aspect of the present disclosure includes a plasticizing device configured to plasticize a material to generate a plasticized material, and a nozzle configured to inject the plasticized material fed from the plasticizing device toward a molding die, wherein the plasticizing device includes a material reservoir which has an input port and is configured to retain the material, a plasticizer which has a screw and a case housing the screw and provided with a feed port communicated with the input port, and which is configured to plasticize the material to generate the plasticized material, a coupling pipe having a coupling path configured to connect the input port and the feed port to each other, a material sensor which has a light emitter configured to emit light toward the screw via the feed port, and a light receiver configured to receive reflected light of the light, and which is configured to detect a remaining amount of the material, and a controller configured to control the material reservoir, the material reservoir has a material feed mechanism configured to feed the material to the coupling path, and the controller controls the material feed mechanism to feed the material to the coupling path when the remaining amount of the material detected by the material sensor is smaller than a reference value.

DESCRIPTION OF AN EXEMPLARY EMBODIMENT

A preferred embodiment of the present disclosure will hereinafter be described in detail using the drawings. It should be noted that the embodiment described hereinafter does not unreasonably limit the contents of the present disclosure as set forth in the appended claims. Further, all of the constituents described hereinafter are not necessarily essential elements of the present disclosure.

1. Three-Dimensional Modeling Device 1.1. Overall Configuration

Figure 1:
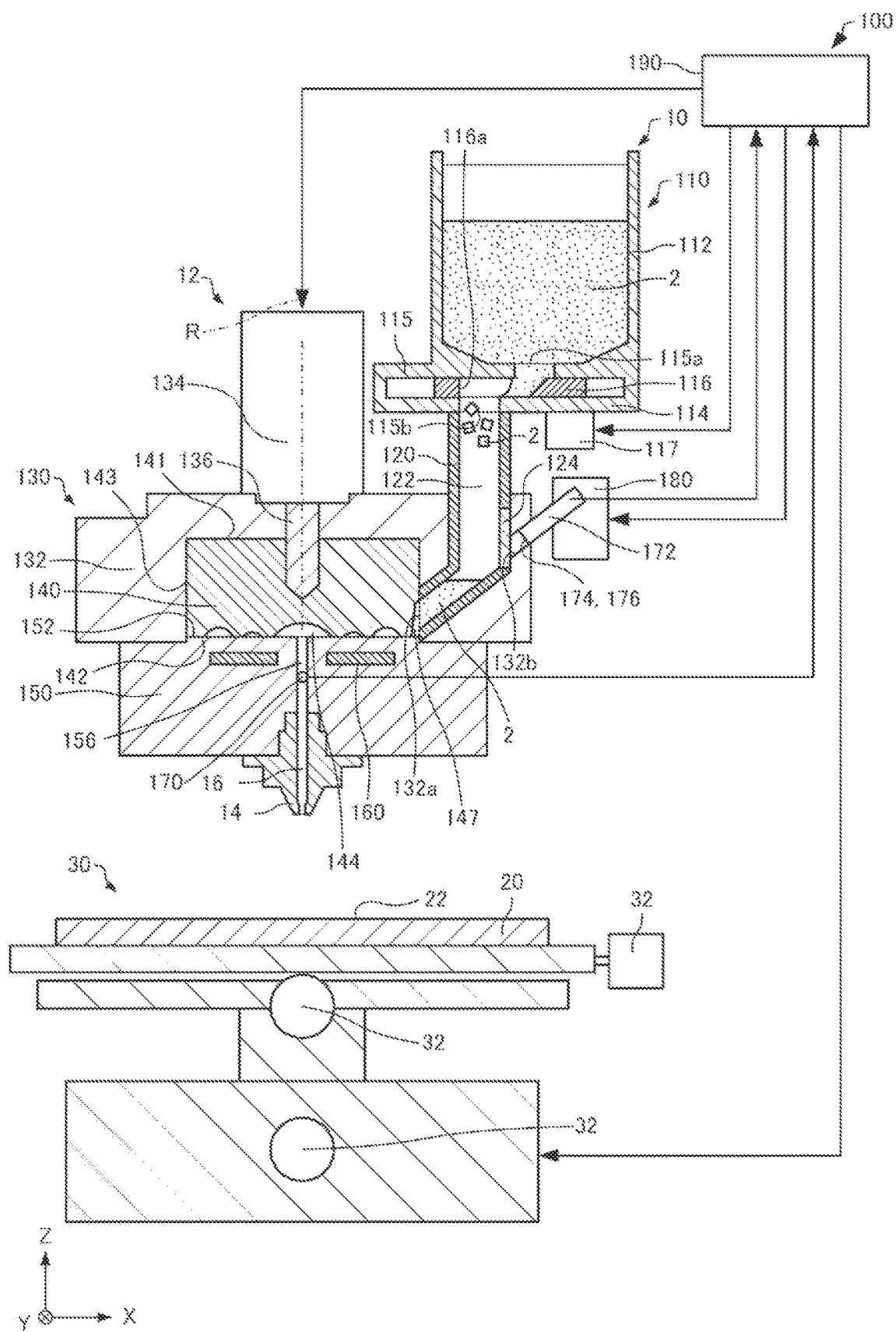
FIG. 1 is a cross-sectional view schematically showing a three-dimensional modeling device according to an embodiment.

First, a three-dimensional modeling device according to the present embodiment will be described with reference to the drawings. FIG. 1 is a cross-sectional view schematically showing a three-dimensional modeling device 100 according to the present embodiment. It should be noted that in FIG. 1, an X axis, a Y axis, and a Z axis are shown as three axes perpendicular to each other. An X-axis direction and a Y-axis direction are each, for example, a horizontal direction. A Z-axis direction is, for example, a vertical direction.

As shown in FIG. 1, the three-dimensional modeling device 100 includes, for example, a modeling unit 10, a stage 20, and a moving mechanism 30.

The three-dimensional modeling device 100 drives the moving mechanism 30 to change a relative position between a nozzle 14 and the stage 20 while ejecting a plasticized material plasticized to the stage 20 from the nozzle 14 of the modeling unit 10. Thus, the three-dimensional modeling device 100 shapes a three-dimensional shaped article having a desired shape on the stage 20. The detailed configuration of the modeling unit 10 will be described later.

The stage 20 is transferred by the moving mechanism 30. On a depositional surface 22 of the stage 20, the plasticized material ejected from the nozzle 14 is deposited, and thus, the three-dimensional shaped article is formed. The plasticized material can directly be deposited on the depositional surface 22 of the stage 20, or can also be deposited on the depositional surface 22 via a sample plate not shown disposed on the stage 20.

The moving mechanism 30 changes a relative position between the modeling unit 10 and the stage 20. In the illustrated example, the moving mechanism 30 moves the stage 20 relatively to the modeling unit 10. The moving mechanism 30 is formed of, for example, a triaxial positioner for moving the stage 20 in the X-axis direction, the Y-axis direction, and the Z-axis direction with driving forces of three motors 32. The motors 32 are controlled by a controller 190.

It should be noted that although not shown in the drawings, the moving mechanism 30 can have a configuration of moving the modeling unit 10 without moving the stage 20. Alternatively, the moving mechanism 30 can have a configuration of moving one of the modeling unit 10 and the stage 20 in the X-axis direction and the Y-axis direction, and moving the other thereof in the Z-axis direction.

1.2. Modeling Unit

The modeling unit 10 includes a plasticizing device 12 and the nozzle 14. The plasticizing device 12 includes, for example, a material reservoir 110, a coupling pipe 120, a plasticizer 130, a pressure sensor 170, a material sensor 172, a detection position changer 180, and the controller 190.

The material reservoir 110 retains a material 2 to be fed to the plasticizer 130. A shape of the material 2 is, for example, a pellet-like shape. A type of the material 2 will be described later. The material reservoir 110 is supported by, for example, a support member not shown. The material reservoir 110 has, for example, a hopper 112 and a material feeding mechanism 114. The hopper 112 is capable of retaining the material 2.

The material feeding mechanism 114 is coupled to the hopper 112. The material feeding mechanism 114 is disposed below the hopper 112. The material feeding mechanism 114 feeds the material 2 to a coupling path 122 of the coupling pipe 120. The material feeding mechanism 114 has, for example, a guide case 115, a material cut-out plate 116, and a cut-out plate driver 117.

An inside of the guide case 115 is a hollow cavity. The guide case 115 has a material inlet 115a disposed at the hopper 112 side, and an input port 115b disposed at the coupling pipe 120 side. Due to the material inlet 115a, an inside of the guide case 115 and an inside of the hopper 112 can be communicated with each other. Due to the input port 115b, the inside of the guide case 115 and the coupling path 122 can be communicated with each other.

The material cut-out plate 116 is disposed inside the guide case 115. The material cut-out plate 116 is provided with an opening 116a. The opening 116a penetrates the material cut-out plate 116. The opening 116a is communicated with the material inlet 115a. Therefore, the material 2 located inside the hopper 112 is fed to the opening 116a through the material inlet 115a.

The material cut-out plate 116 reciprocates while sliding inside the guide case 115 in the X-axis direction due to the cut-out plate driver 117. In the illustrated example, the opening 116a is communicated with the input port 115b. Therefore, the material 2 of the opening 116a is fed to the coupling path 122 through the input port 115b.

Figure 2:
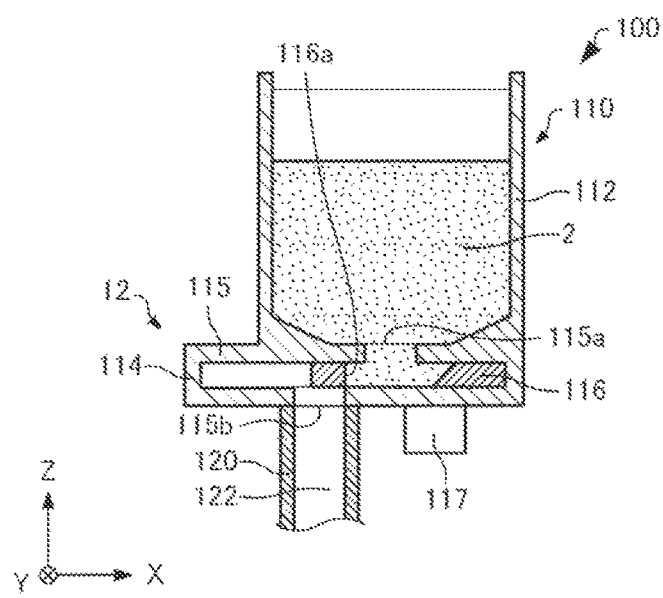
FIG. 2 is a cross-sectional view schematically showing the three-dimensional modeling device according to the embodiment.

Here, FIG. 2 is a cross-sectional view schematically showing the plasticizing device 12. In the example shown in FIG. 2, the material cut-out plate 116 is displaced toward the +X-axis direction compared to the example shown in FIG. 1. In the example shown in FIG. 2, the input port 115b does not overlap the opening 116a when viewed from the Z-axis direction. Therefore, the material 2 in the opening 116a is not fed to the coupling path 122.

The cut-out plate driver 117 moves the material cut-out plate 116 in the X-axis direction. The cut-out plate driver 117 is not particularly limited providing the cut-out plate driver 117 is capable of moving the material cut-out plate 116 in the X-axis direction, but is configured including, for example, an air cylinder. The cut-out plate driver 117 is controlled by the controller 190.

As described above, the material feeding mechanism 114 is capable of feeding a predetermined amount of material 2 to the coupling path 122 via the input port 115b, and stopping the feed of the material 2 to the coupling path 122 by moving the material cut-out plate 116 using the cut-out plate driver 117.

As shown in FIG. 1, the coupling pipe 120 couples the material reservoir 110 and the plasticizer 130 to each other. The coupling pipe 120 is coupled to the guide case 115 of the material feeding mechanism 114. In the illustrated example, a part of the coupling pipe 120 is provided to a screw case 132 of the plasticizer 130. The part of the coupling pipe 120 provided to the screw case 132 can be formed integrally with the screw case 132.

The coupling pipe 120 has the coupling path 122. The coupling path 122 connects the input port 115b and a feed port 132a provided to the screw case 132 to each other. The material 2 enters the coupling path 122 from the input port 115b, and is then fed from the feed port 132a to a first groove 144 provided to a screw 140.

The coupling pipe 120 has a window 124. The window 124 is formed of a transparent material transparent with respect to light emitted by the material sensor 172. As the transparent material, there can be cited, for example, glass.

The plasticizer 130 has, for example, the screw case 132, a drive motor 134, the screw 140, a barrel 150, and heaters 160. The plasticizer 130 plasticizes the material 2 in a solid state fed from the coupling pipe 120 to generate the plasticized material in a paste form having fluidity, and then feeds the plasticized material to the nozzle 14.

It should be noted that plasticization is a concept including melting, and means to change a solid substance to a state having fluidity. Specifically, in the case of the material 2 in which glass transition occurs, the plasticization means that the temperature of the material 2 is made equal to or higher than the glass-transition point. In the case of the material 2 in which the glass transition does not occur, the plasticization means that the temperature of the material 2 is made equal to or higher than a melting point.

The screw case 132 is a chassis for housing the screw 140. On a lower surface of the screw case 132, there is disposed the barrel 150. In a space surrounded by the screw case 132 and the barrel 150, there is housed the screw 140.

The screw case 132 is provided with the feed port 132a for feeding the material 2 to the first groove 144 provided to the screw 140. The feed port 132a is communicated with the input port 115b via the coupling path 122.

The screw case 132 is provided with, for example, a sensor insertion part 132b to which the material sensor 172 is inserted. By the material sensor 172 being inserted in the sensor insertion part 132b, it is possible for the screw case 132 to support the material sensor 172.

The drive motor 134 is disposed on an upper surface of the screw case 132. The drive motor 134 is, for example, a servomotor. A shaft 136 of the drive motor 134 is coupled to an upper surface 141 of the screw 140. The drive motor 134 rotates the screw 140. The drive motor 134 is controlled by the controller 190. It should be noted that although not shown in the drawings, it is possible for the shaft 136 of the drive motor 134 and the upper surface 141 of the screw 140 to be coupled to each other via a reduction gear.

The screw 140 is, for example, a flat screw having a substantially columnar shape smaller in size in a rotational axis R direction than in a direction perpendicular to the rotational axis R direction. In the illustrated example, the rotational axis R is parallel to the Z axis. Due to the torque generated by the drive motor 134, the screw 140 rotates around the rotational axis R.

Figure 3:
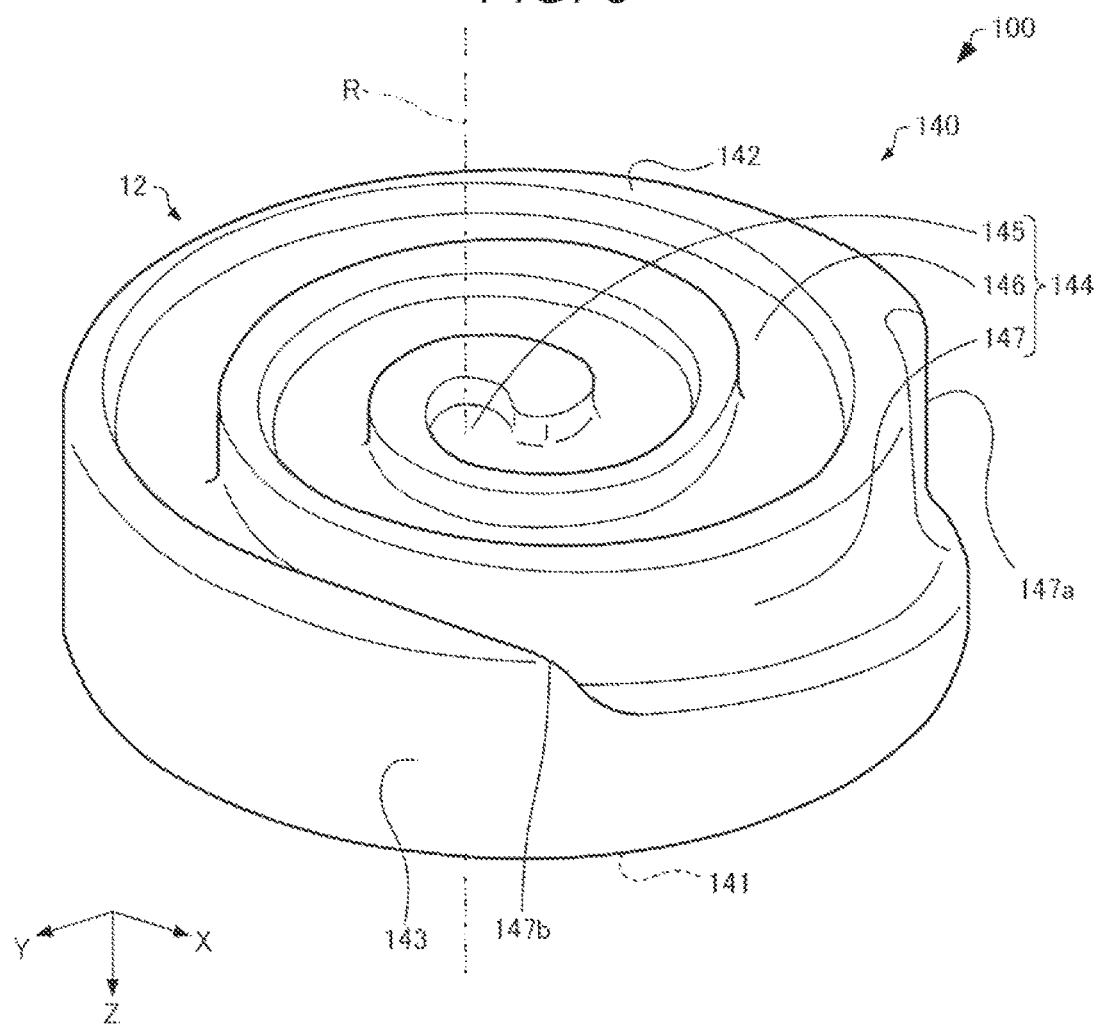
FIG. 3 is a perspective view schematically showing a screw of the three-dimensional modeling device according to the embodiment.
Figure 4:
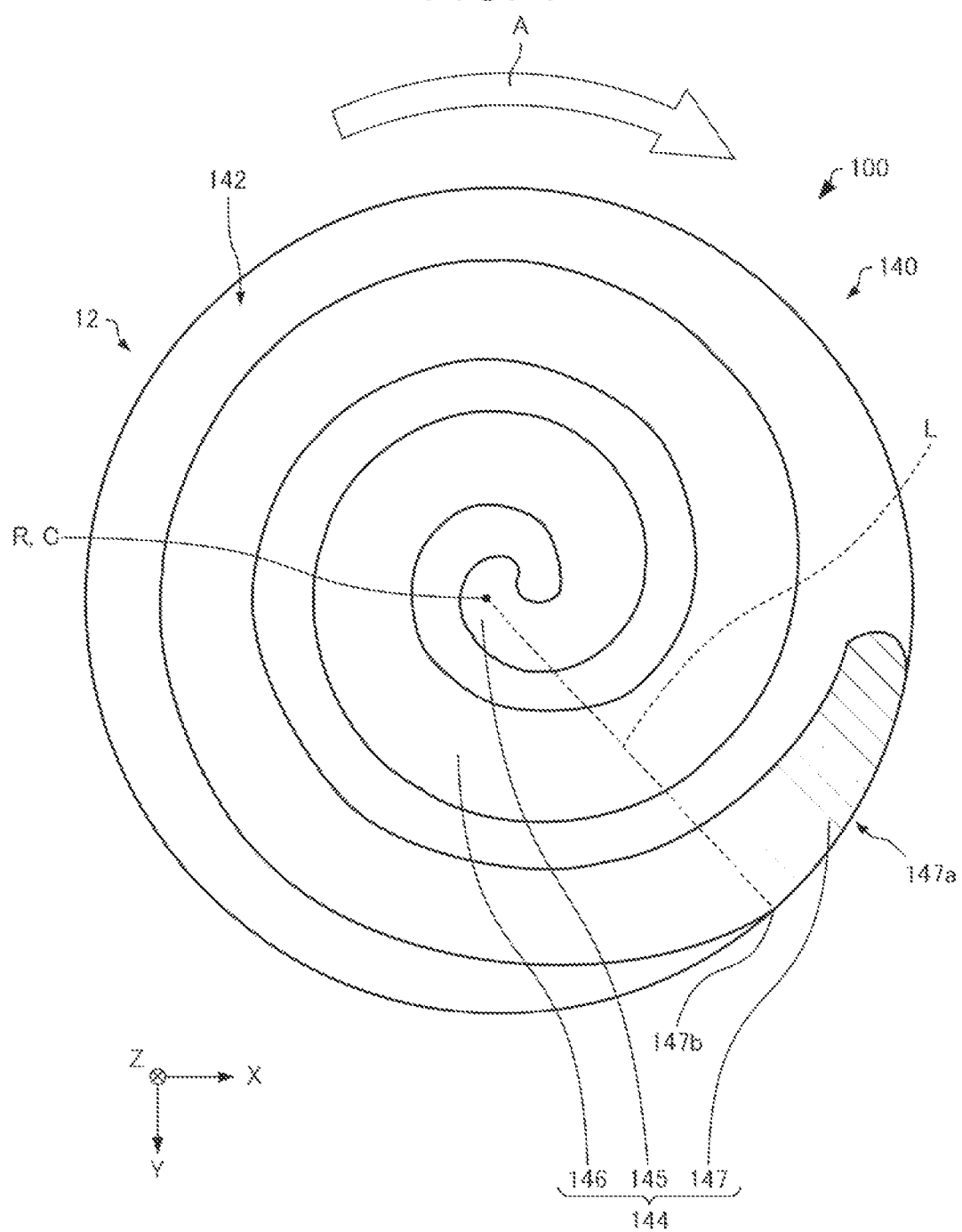
FIG. 4 is a bottom view schematically showing the screw of the three-dimensional modeling device according to the embodiment.

The screw 140 has the upper surface 141, a groove forming surface 142 at an opposite side to the upper surface 141, and a side surface 143 connecting the upper surface 141 and the groove forming surface 142 to each other. On the groove forming surface 142, there is formed the first groove 144. The side surface 143 is perpendicular to, for example, the groove forming surface 142. Here, FIG. 3 is a perspective view schematically showing the screw 140. FIG. 4 is a bottom view schematically showing the screw 140. It should be noted that FIG. 3 and FIG. 4 each show a state in which a vertical positional relationship is reversed from the state shown in FIG. 1 for the sake of convenience.

As shown in FIG. 3 and FIG. 4, on the groove forming surface 142 of the screw 140, there are formed the first groove 144. The first groove 144 is a spiral groove or a vortical groove when viewed from the Z-axis direction. The screw 140 rotates in an arrow A direction shown in FIG. 4 centering on the rotational axis R. As shown in FIG. 3 and FIG. 4, the first groove 14 has, for example, a central portion 145, a connection portion 146, and a material introduction portion 147.

The central portion 145 of the first groove 144 is opposed to a communication hole 156 provided to the barrel 150. The central portion 145 is communicated with the communication hole 156. The central portion 145 is a portion including a center C of the screw 140 when viewed from the Z-axis direction. When viewed from the Z-axis direction, the position of the rotational axis R of the screw 140 coincides with the position of the center C of the screw 140.

The connection portion 146 of the first groove 144 connects the central portion 145 and the material introduction portion 147 to each other. In the illustrated example, the connection portion 146 is formed from the central portion 145 toward the material introduction portion 147 so as to form a vortical shape.

The material introduction portion 147 of the first groove 144 is fed with the material 2 from the feed port 132a provided to the screw case 132. The material introduction portion 147 has an introduction port 147a formed on the side surface 143 of the screw 140. As shown in FIG. 4, when viewed from the Z-axis direction, an imaginary line segment L is a line segment connecting an end 147b in the rotational direction of the introduction port 147a, and the center C of the screw 140 to each other. The material introduction portion 147 is a portion where the side surface 143 is opened by the introduction port 147a, and is a portion at the upstream in the path of the material 2 in the first groove 144 from the imaginary line segment L when viewed from the Z-axis direction. In the example shown in FIG. 4, the material introduction portion 147 is a portion indicated by hatching. The material 2 introduced into the material introduction portion 147 is conveyed to the communication hole 156 provided to the barrel 150 through the connection portion 146 and the central portion 145.

It should be noted that the number of the first grooves 144 is not particularly limited. Although in the illustrated example, the first groove 144 is formed alone, it is possible to form two first grooves 144, or to form three or more first grooves 144.

As shown in FIG. 1, the barrel 150 is disposed below the screw 140. The barrel 150 has an opposed surface 152 opposed to the groove forming surface 142 of the screw 140. At the center of the opposed surface 152, there is formed the communication hole 156 communicated with the first groove 144. Here, FIG. 5 is a plan view schematically showing the barrel 150.

Figure 5:
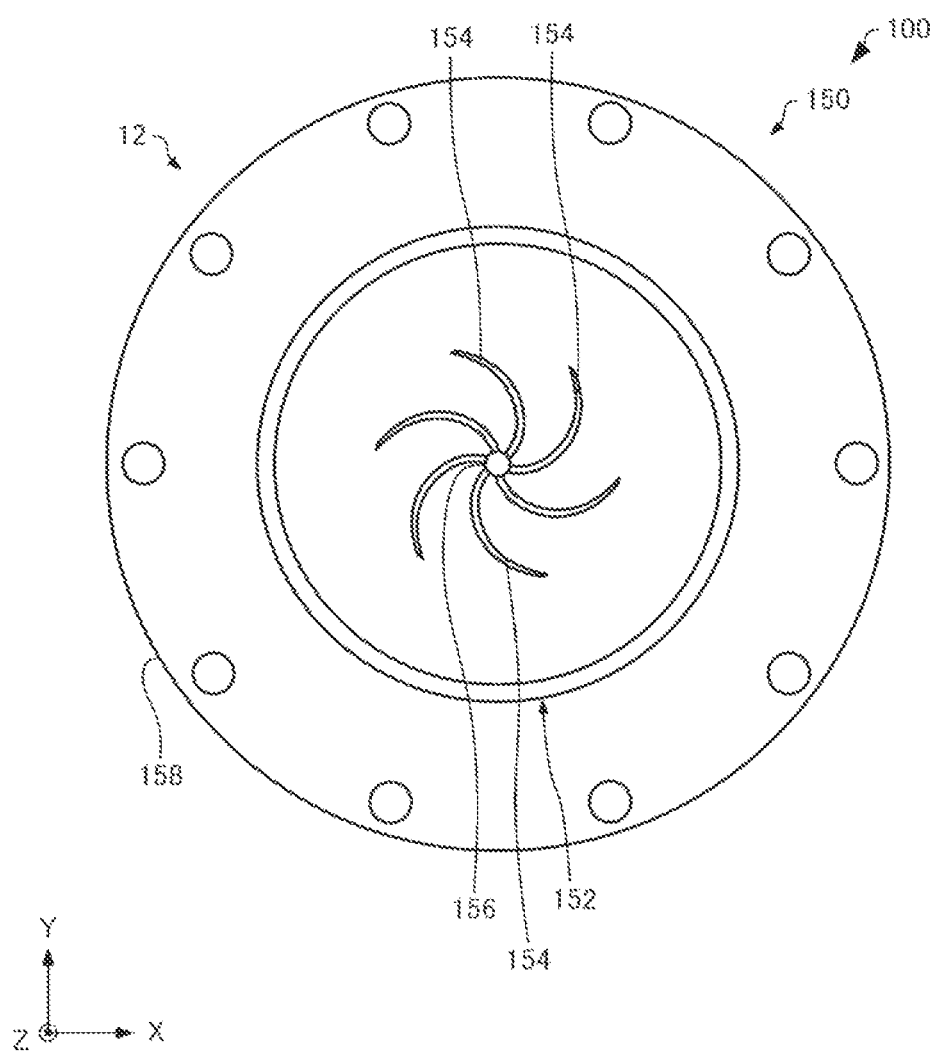
FIG. 5 is a plan view schematically showing a barrel of the three-dimensional modeling device according to the embodiment.

As shown in FIG. 5, on the opposed surface 152 of the barrel 150, there are formed second grooves 154 and the communication hole 156. There is formed a plurality of the second grooves 154. Although there are formed the six second grooves 154 in the illustrated example, the number thereof is not particularly limited. The plurality of second grooves 154 is formed on the periphery of the communication hole 156 when viewed from the Z-axis direction. The second grooves 154 are each coupled to the communication hole 156 at one end thereof, and each extend from the communication hole 156 toward an outer circumference 158 of the barrel 150 so as to form a vortical shape. The second grooves 154 each have a function of guiding the plasticized material to the communication hole 156. Into the communication hole 156, there inflows the plasticized material.

It should be noted that the shape of the second groove 154 is not particularly limited, and can also be, for example, a linear shape. Further, each of the second grooves 154 is not required to be coupled to the communication hole 156 at one end. Further, the second grooves 154 are not required to be formed on the opposed surface 152. It should be noted that it is preferable for the second grooves 154 to be formed on the opposed surface 152 taking the fact that the plasticized material is efficiently guided to the communication hole 156 into consideration.

As shown in FIG. 1, the heaters 160 are provided to the barrel 150. The heaters 160 are each formed of, for example, a rod heater. The heaters 160 heat the material 2 fed between the screw 140 and the barrel 150. The heaters 160 are controlled by the controller 190. The plasticizer 130 heats the material 2 while conveying the material 2 toward the communication hole 156 with the screw 140, the barrel 150, and the heater 160 to thereby generate the plasticized material, and then makes the plasticized material thus generated outflow from the communication hole 156.

The nozzle 14 is disposed below the barrel 150. The nozzle 14 ejects the plasticized material fed from the plasticizer 130 toward the stage 20. The nozzle 14 is provided with a nozzle flow channel 16. The nozzle flow channel 16 is communicated with the communication hole 156. The plasticized material fed from the communication hole 156 is ejected through the nozzle flow channel 16.

The pressure sensor 170 is provided to the communication hole 156. The pressure sensor 170 detects the pressure in the communication hole 156.

The material sensor 172 is provided to, for example, the screw case 132. In the illustrated example, the material sensor 172 is provided to the sensor insertion part 132b provided to the screw case 132. The material sensor 172 has light emitter 174 and a light receiver 176.

The light emitter 174 of the material sensor 172 emits light toward the screw 140 via the feed port 132a provided to the screw case 132. The light emitted from the light emitter 174 passes through the window 124 of the coupling pipe 120. The light emitter 174 is formed of, for example, a semiconductor laser or an LED (Light Emitting Diode).

The light receiver 176 of the material sensor 172 receives reflected light of the light emitted from the light emitter 174. The reflected light passes through the window 124. For example, when the material introduction portion 147 is filled with the material 2, the light receiver 176 receives the reflected light which is the light emitted from the light emitter 174, and is reflected by the material 2. When no material 2 exists in the material introduction portion 147, the light receiver 176 receives the reflected light which is the light emitted from the light emitter 174, and is reflected by the screw 140 for defining the material introduction portion 147. The light receiver 176 is formed of, for example, a PD (Photodiode).

The material sensor 172 is a TOF (Time of Flight) sensor for detecting a remaining amount of the material 2 based on, for example, flight time of light until the light emitted by the light emitter 174 is received by the light receiver 176. When the remaining amount of the material 2 is large, the flight time of the light shortens.

Figure 6:
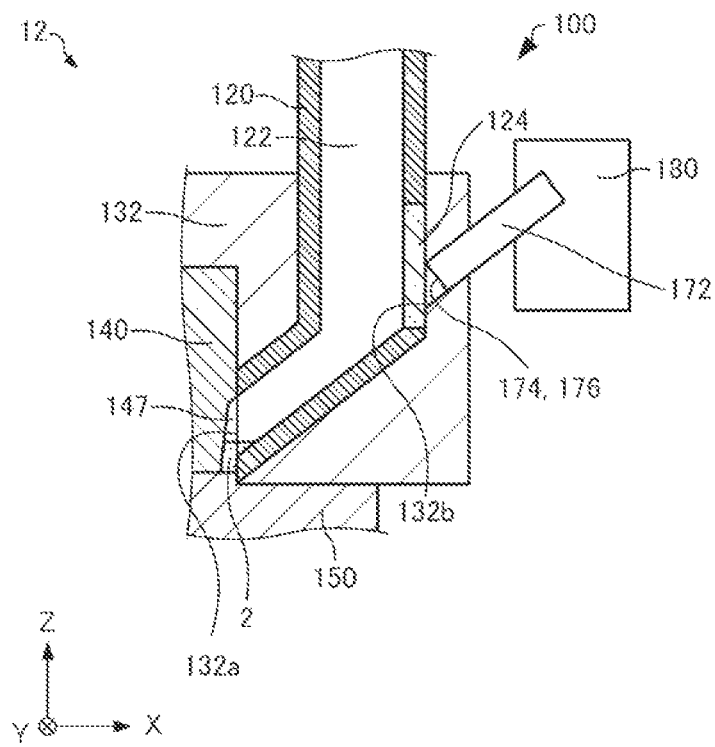
FIG. 6 is a cross-sectional view schematically showing the three-dimensional modeling device according to the embodiment.

The detection position changer 180 is coupled to, for example, the material sensor 172. The detection position changer 180 changes a detection position by the material sensor 172. When the material 2 does not include elastomer, the detection position changer 180 positions the material sensor 172 at a position where the remaining amount of the material 2 in the coupling path 122 can be detected as shown in FIG. 1. In contrast, when the material 2 includes elastomer, the detection position changer 180 positions the material sensor 172 at a position where the remaining amount of the material 2 in the material introduction portion 147 of the first groove 144 can be detected as shown in FIG. 6. As the elastomer, there can be cited, for example, styrene thermoplastic elastomer (TPS) and polyurethane thermoplastic elastomer (TPU).

The detection position changer 180 moves the material sensor 172 so that the detection of the remaining amount of the material 2 in the coupling path 122 and the detection of the remaining amount of the material 2 in the material introduction portion 147 are accurately performed. In the example shown in FIG. 6, the material sensor 172 is moved to a position closer to the material introduction portion 147 compared to the example shown in FIG. 1. In the example shown in FIG. 1, the feed port 132a is filled with the material 2, and there occurs a state in which the material introduction portion 147 cannot be seen from the light emitter 174 due to the material 2 located in the coupling path 122. In the example shown in FIG. 6, the feed port 132a is not filled with the material 2, and there occurs a state in which the material introduction portion 147 can be seen from the light emitter 174. The detection position changer 180 is formed of, for example, a pulley.

It should be noted that the detection position changer 180 can change the detection position by the material sensor 172 by moving the position of the material sensor 172 as described above, or can change the detection position by the material sensor 172 by changing a light path of the light emitted by the light emitter 174 without changing the position of the material sensor 172. When changing the light path, the detection position changer 180 can be configured including a mirror for reflecting the light emitted by the light emitter 174 and a mirror changing mechanism for changing an angle and a position of the mirror.

The controller 190 is formed of a computer provided with, for example, a processor, a main storage device, and an input/output interface for performing input/output of signals with the outside. The controller 190 exerts a variety of functions due to, for example, the processor executing a program retrieved in the main storage device. Specifically, the controller 190 controls the motors 32, the material feeding mechanism 114 of the material reservoir 110, the drive motor 134, the heater 160, and the detection position changer 180. It should be noted that it is also possible for the controller 190 to be formed of a combination of a plurality of circuits instead of the computer.

1.3. Processing of Controller

Figure 7:
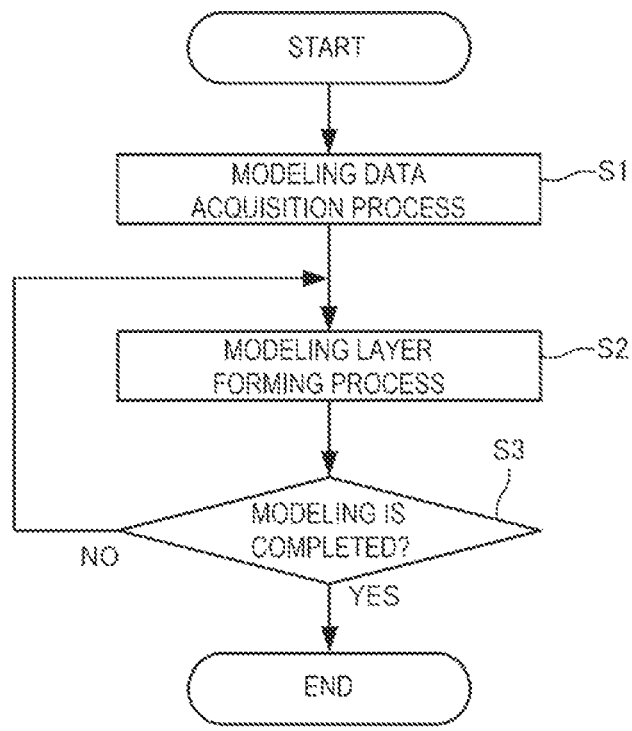
FIG. 7 is a flowchart for explaining processing of a controller of the three-dimensional modeling device according to the embodiment.

FIG. 7 is a flowchart for explaining the processing of the controller 190.

A user operates, for example, an operator not shown to output a processing start signal for starting the processing to the controller 190. The operator is formed of, for example, a mouse, a keyboard, or a touch panel. The controller 190 starts the processing when receiving the processing start signal. The processing will hereinafter be described.

1.3.1. Modeling Data Acquisition Process

First, as shown in FIG. 7, the controller 190 executes a modeling data acquisition process of obtaining modeling data for shaping a three-dimensional shaped article as the step S1.

The modeling data includes information related to a type of the material 2 retained in the material reservoir 110, a moving path of the nozzle 14 with respect to the stage 20, an amount of the plasticized material to be ejected from the nozzle 14, and so on.

The modeling data is created by making, for example, slicer software installed in a computer coupled to the three-dimensional modeling device 100 read shape data. The shape data is data representing a target shape of the three-dimensional shaped article created using three-dimensional CAD (Computer Aided Design) software, three-dimensional CG (Computer Graphics) software, or the like. As the shape data, there is used data in, for example, an STL (Standard Triangulated Language) format or an AMF (Additive Manufacturing File Format). The slicer software divides the target shape of the three-dimensional shaped article into layers of a predetermined thickness, and creates the modeling data for each of the layers. The modeling data is represented by a G code, an M code, or the like. The controller 190 obtains the modeling data from a computer coupled to the three-dimensional modeling device 100 or a recording medium such as a USB (Universal Serial Bus) memory.

1.3.2. Modeling Layer Forming Process

Then, the controller 190 performs the modeling layer forming process of forming a modeling layer on the stage 20 as the step S2.

In the modeling layer forming process, the controller 190 controls the material feed mechanism 114 to feed the material 2 to the coupling path 122 when the remaining amount of the material 2 detected by the material sensor 172 is lower than a reference value.

Specifically, first, the controller 190 obtains the information of the reference value of the remaining amount of the material 2 and the information of the type of the material 2 retained in the material reservoir 110 from the modeling data. Then, the controller 190 determines whether or not the material 2 includes the elastomer based on the information of the type of the material 2 thus obtained. When it is determined that the material 2 does not include the elastomer, the controller 190 controls the detection position changer 180 to move the material sensor 172 to the position where the material sensor 172 can detect the remaining amount of the material 2 in the coupling path 122 as shown in FIG. 1. Then, the material sensor 172 detects the remaining amount of the material 2 in the coupling path 122. The controller 190 controls the material feed mechanism 114 to feed the material 2 to the coupling path 122 when the controller 190 determines that the remaining amount of the material 2 in the coupling path 122 is lower than the reference value. More specifically, the controller 190 drives the cut-out plate driver 117 of the material feed mechanism 114 to move the material cut-out plate 116 so that the input port 115b and the opening 116a are communicated with each other to thereby feed the material 2 to the coupling path 122. The controller 190 disposes the material cut-out plate 116 at the position where the input port 115b and the opening 116a are not communicated with each other to prevent the material 2 from being fed when the controller 190 determines that the remaining amount of the material 2 in the coupling path 122 is no lower than the reference value. When the material 2 does not include the elastomer, the reference value is, for example, a value is greater than zero.

In contrast, when the controller 190 has determined that the material 2 includes the elastomer, the controller 190 controls the detection position changer 180 to move the material sensor 172 to the position where the material sensor 172 can detect the remaining amount of the material 2 in the material introduction portion 147 as shown in FIG. 6. Then, the material sensor 172 detects the remaining amount of the material 2 in the material introduction portion 147. For example, when the controller 190 has determined that the remaining amount of the material 2 in the material introduction portion 147 is zero, the controller 190 controls the material feed mechanism 114 to feed the material 2 to the material introduction portion 147. When the controller 190 has determined that the remaining amount of the material 2 in the material introduction portion 147 is not zero, the controller 190 prevents the material 2 from being fed. In this case, it is possible for the controller 190 to increase a rotational frequency of the screw 140 in order to prevent the plasticized material to be ejected from the nozzle 14 from being unintentionally interrupted.

In the modeling layer forming process, the controller 190 plasticizes the material 2 fed between the screw 140 and the barrel 150 to generate the plasticized material, and then makes the plasticized material outflow from the communication hole 156. The controller 190 continues to generate the plasticized material until the modeling layer forming process is terminated. Here, FIG. 8 is a cross-sectional view for explaining the modeling layer forming process.

Figure 8:
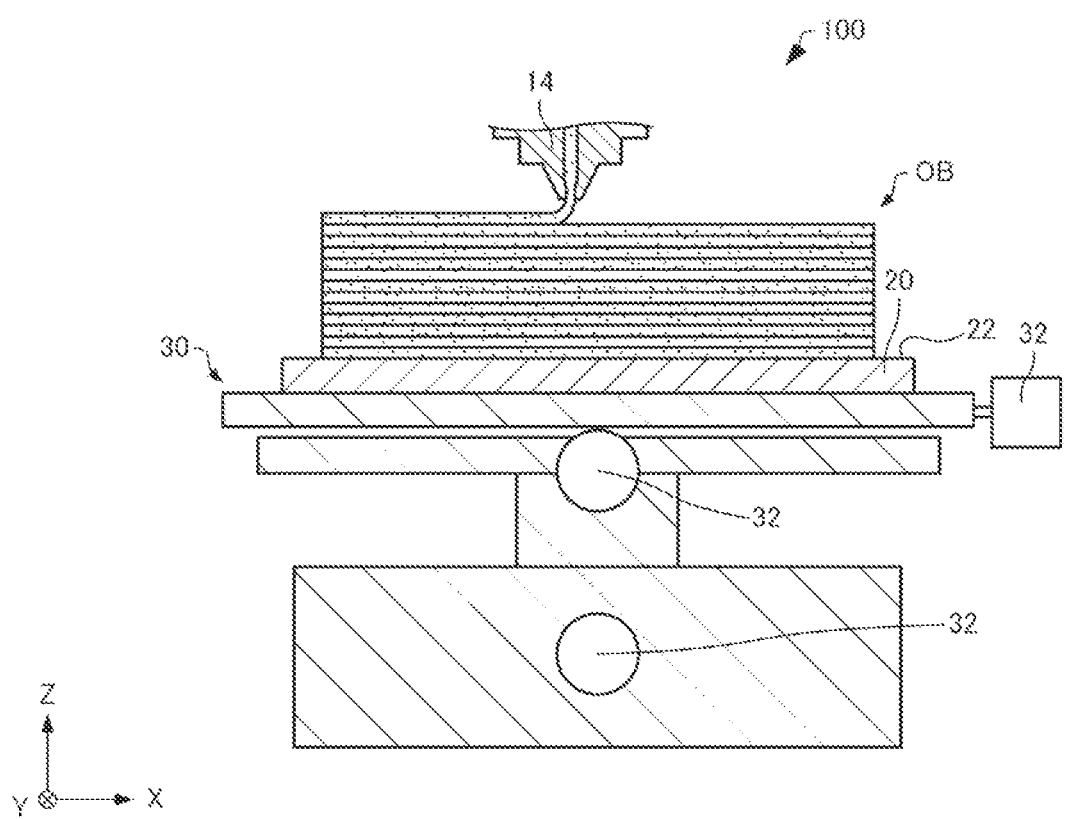
FIG. 8 is a cross-sectional view for explaining a modeling layer forming process of the three-dimensional modeling device according to the embodiment.

As shown in FIG. 8, the controller 190 ejects the plasticized material from the nozzle 14 toward the depositional surface 22 while controlling the moving mechanism 30 based on the modeling data obtained to change the relative position between the nozzle 14 and the depositional surface 22 of the stage 20. Thus, for example, there is formed a first layer out of the plurality of modeling layers constituting the three-dimensional shaped article OB.

In the modeling layer forming process, the controller 190 controls the rotational frequency of the screw 140 based on the detection value of the pressure sensor 170. Specifically, the controller 190 controls the rotational frequency of the screw 140 so that the detection value of the pressure sensor 170 becomes a predetermined value. When the detection value of the pressure sensor 170 is higher than the predetermined value, the controller 190 decreases the rotational frequency of the screw 140 so that the detection value of the pressure sensor 170 becomes the predetermined value. When the detection value of the pressure sensor 170 is lower than the predetermined value, the controller 190 increases the rotational frequency of the screw 140 so that the detection value of the pressure sensor 170 becomes the predetermined value. The controller 190 controls the rotational frequency of the screw 140 until the modeling layer forming process is terminated.

The controller 190 calculates a phase of the screw 140 at a predetermined time point based on the rotational frequency of the screw 140 while controlling the rotational frequency of the screw 140 so that the detection value of the pressure sensor 170 becomes the predetermined value as described above. Then, the controller 190 corrects the remaining amount of the material 2 detected by the material sensor 172 based on the phase of the screw 140 thus calculated. The phase $\theta(t)$ of the screw 140 at the predetermined time t is represented by the following formula (1) denoting the rotational frequency of the screw 140 by f.

$$\theta(t+\Delta t)=\theta(t)+2\pi f\Delta t \quad (1)$$

1.3.3. Determination Process

Then, as shown in FIG. 7, as the step S3, the controller 190 executes processing of determining whether or not all of the modeling layers of the three-dimensional shaped article OB are formed, and thus, the modeling is completed based on the modeling data thus obtained.

When there has not been determined that the modeling of the three-dimensional shaped article OB is completed ("NO" in the step S3), the controller 190 returns to the modeling layer forming process in the step S2 to form, for example, the remaining modeling layers of the three-dimensional shaped article OB. In contrast, when it has been determined that the modeling of the three-dimensional shaped article OB is completed ("YES" in the step S3), the controller 190 terminates the processing. The controller 190 repeatedly performs the processes in the step S2 and the step S3 until it is determined that the modeling of the three-dimensional shaped article OB is completed in the step S3.

1.4. Functions and Advantages

In the plasticizing device 12, there are included the material reservoir 110 having the input port 115*b* and retaining the material 2, and the plasticizer 130 having the screw 140 and the screw case 132 which houses the screw 140 and is provided with the feed port 132*a* communicated with the input port 115*b*, and plasticizing the material 2 to generate the plasticized material. Further, in the plasticizing device 12, there are included the coupling pipe 120, the material sensor 172, and the controller 190, wherein the coupling pipe 120 has the coupling path 122 for connecting the input port 115*b* and the feed port 132*a* to each other, the material sensor 172 has the light emitter 174 for emitting the light toward the screw 140 via the feed port 132*a*, and the light receiver 176 for receiving the reflected light of that light, and detects the remaining amount of the material 2, and the controller 190 controls the material reservoir 110. The material reservoir 110 has the material feeding mechanism 114 for feeding the material 2 to the coupling path 122, and when the remaining amount of the material 2 detected by the material sensor 172 is lower than the reference value, the controller 190 controls the material feed mechanism 114 to feed the material 2 to the coupling path 122.

Therefore, in the plasticizing device 12, it is possible to reduce the possibility that the material 2 gets stuck compared to when, for example, always feeding the material to the coupling path in the modeling layer forming process. Thus, it is possible to more stably plasticize the material 2.

In the plasticizing device 12, the screw 140 is a flat screw having the groove forming surface 142 provided with the first groove 144 having a spiral shape. The plasticizer 130 has the drive motor 134 for rotating the flat screw, and the barrel 150 which has the opposed surface 152 opposed to the groove forming surface 142 and is provided with the communication hole 156 into which the plasticized material inflows. On the side surface 143 of the flat screw, there is formed the material introduction portion 147 for introducing the material 2 to the first groove 144, and the material sensor 172 detects the remaining amount of the material 2 in the material introduction portion 147. Therefore, in the plasticizing device 12, it is possible to reduce the possibility that the material 2 gets stuck in the material introduction portion 147.

It should be noted that the screw 140 is not limited to the flat screw. Although not shown in the drawings, the screw 140 can be an in-line screw.

In the plasticizing device 12, when the controller 190 has determined that the remaining amount of the material 2 in the material introduction portion 147 is zero, the controller 190 controls the material feed mechanism 114 to feed the material 2. Therefore, in the plasticizing device 12, it is possible to further reduce the possibility that the material 2 gets stuck in the material introduction portion 147.

In the plasticizing device 12, there is included the detection position changer 180 for changing the detection position by the material sensor 172, and the controller 190 controls the detection position changer 180 so that the material sensor 172 detects the remaining amount of the material 2 in the material introduction portion 147 when the material 2 includes the elastomer, and the material sensor 172 detects the remaining amount of the material 2 in the coupling path 122 when the material 2 does not include the elastomer.

Here, the elastomer is resin higher in elasticity and stretching property, and lighter compared to acrylonitrile-butadiene-styrene (ABS) resin or the like which is not the elastomer. Since the elastomer has such a characteristic, when the elastomer exists in an unplasticized state in the material introduction portion, a material residue is apt to occur due to a shear fracture caused by shear of the screw and the screw case, or friction with the screw case. When the material residues occur, the material residues are bridged with each other to cause clogging.

To cope with the problem described above, in the plasticizing device 12, when the material 2 includes the elastomer, the material sensor 172 detects the remaining amount of the material 2 in the material introduction portion 147, and therefore, the amount of the elastomer existing in the material introduction portion 147 in the unplasticized state is reduced. Thus, it is possible to prevent the material residue from occurring, and thus, it is possible to reduce the possibility that the clogging occurs. In contrast, when the material 2 does not include the elastomer, since the material residue is difficult to occur compared to when the elastomer is included, it is possible for the material sensor 172 to prevent the feed of the material 2 to the material introduction portion 147 from being interrupted by detecting the remaining amount of the material 2 in the coupling path 122.

In the plasticizing device 12, there is included the pressure sensor 170 for detecting the pressure in the communication hole 156, and the controller 190 controls the rotational frequency of the flat screw based on the detection value of the pressure sensor 170. Therefore, in the plasticizing device 12, even when, for example, the feed amount of the material 2 to the first groove 144 decreases, it is possible to reduce the variation in amount of the plasticized material passing through the communication hole 156 by increasing the rotational frequency of the flat screw.

In the plasticizing device 12, the controller 190 calculates the phase of the screw 140 at the predetermined time point based on the rotational frequency of the screw 140, and then corrects the remaining amount of the material 2 detected by the material sensor 172 based on the phase of the screw 140 thus calculated. The remaining amount of the material 2 detected by the material sensor 172 fluctuates due to the rotational frequency of the screw 140. To cope with such a problem, in the plasticizing device 12, the remaining amount of the material 2 detected by the material sensor 172 is corrected based on the phase of the screw 140, and therefore, it is possible to obtain a more accurate remaining amount.

In the plasticizing device 12, the coupling pipe 120 has the window 124 formed of the transparent material, and the light emitted by the light emitter 174 and the reflected light of that light pass through the window 124. Therefore, in the plasticizing device 12, it is possible to dispose the material sensor 172 outside the coupling pipe 120.

1.5. Material

As the material 2 to be retained in the material reservoir 110, there can be cited materials using a variety of materials such as a material having a thermoplastic property, a metal material, or a ceramic material as a chief material. Here, the "chief material" means a material playing a central role for forming the shape of the shaped article, and means a material having a content rate no lower than 50% by mass in the shaped article. The material described above includes those obtained by melting these chief materials alone, and those obtained by melting some of the components included therein together with the chief material in paste form.

As the material having the thermoplastic property, it is possible to use, for example, the thermoplastic resin. As the thermoplastic resin, there can be cited general-purpose engineering plastic such as ABS resin, polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate, and engineering plastic such as polysulfone, polyether sulfone, polyphenylene sulfide, polyarylate, polyimide, polyamide-imide, polyetherimide, and polyether ether ketone (PEEK).

In the material having the thermoplastic property, there can be mixed an additive agent such as wax, flame retardant, antioxidant, or thermal stabilizer, and so on in addition to pigment, metal, and ceramic. In the plasticizer 130, the material having the thermoplastic property is plasticized by the rotation of the screw 140 and heating by the heater 160 to be transformed into the melted state. Further, the plasticized material generated in such a manner is ejected from the nozzle 14, and then cures due to drop in temperature. It is desirable for the material having the thermoplastic property to be heated at a temperature no lower than the glass-transition point and then ejected from the nozzle 14 in a completely melted state.

In the plasticizer 130, a metal material, for example, can be used as the chief material instead of the material having the thermoplastic property described above. In this case, it is desirable that components to be melted when generating the plasticized material are mixed in a powder material obtained by powdering the metal material, and then the mixture is loaded into the plasticizer 130.

As the metal material, there can be cited, for example, magnesium (Mg), iron (Fe), cobalt (Co), chromium (Cr), aluminum (Al), titanium (Ti), copper (Cu), or nickel (Ni) as a single metal, or alloys including one or more of these metals, Or maraging steel, stainless steel, cobalt-chromium-molybdenum, titanium alloy, nickel alloy, aluminum alloy, cobalt alloy, or cobalt-chrome alloy.

In the plasticizer 130, it is possible to use a ceramic material as the chief material instead of the metal material described above. As the ceramic material, there can be cited, for example, oxide ceramic such as silicon dioxide, titanium dioxide, aluminum oxide, or zirconium oxide, and non-oxide ceramic such as aluminum nitride.

The powder material of the metal material or the ceramic material to be retained in the material reservoir 110 can also be a mixed material obtained by mixing a plurality of types of single metal powder, alloy powder, or ceramic material powder. Further, the powder material of the metal material or the ceramic material can also be coated with, for example, the thermoplastic resin described above or other thermoplastic resin. In this case, it is also possible to assume that the thermoplastic resin is melted to develop the fluidity in the plasticizer 130.

It is also possible to add, for example, a solvent to the powder material of the metal material or the ceramic material to be retained in the material reservoir 110. As the solvent, there can be cited, for example, water; a (poly) alkylene glycol monoalkyl ether group such as ethylene glycol monomethyl ether, ethylene glycol monoethyl ether, propylene glycol monomethyl ether, or propylene glycol monoethyl ether; an ester acetate group such as ethyl acetate, n-propyl acetate, isopropyl acetate, n-butyl acetate, or isobutyl acetate; an aromatic hydrocarbon group such as benzene, toluene, or xylene; a ketone group such as methyl ethyl ketone, acetone, methyl isobutyl ketone, ethyl-n-butyl ketone, diisopropyl ketone, or acethylacetone; an alcohol group such as ethanol, propanol, or butanol; a tetraalkylammonium acetate group; a sulfoxide series solvent such as dimethyl sulfoxide, or diethyl sufoxide; a pyridine series solvent such as pyridine, γ-picoline, or 2,6-lutidine; tetraalkylammonium acetate (e.g., tetrabutylammonium acetate); and an ionic liquid such as butyl carbitol acetate.

Besides the above, it is also possible to add, for example, a binder to the powder material of the metal material or the ceramic material to be retained by the material reservoir 110. As the binder, there can be cited, for example, acrylic resin, epoxy resin, silicone resin, cellulosic resin, or other synthetic resin, polylactic acid (PLA), polyamide (PA), polyphenylene sulfide (PPS), PEEK, or other thermoplastic resin.

2. Injection Molding Device

Figure 9:
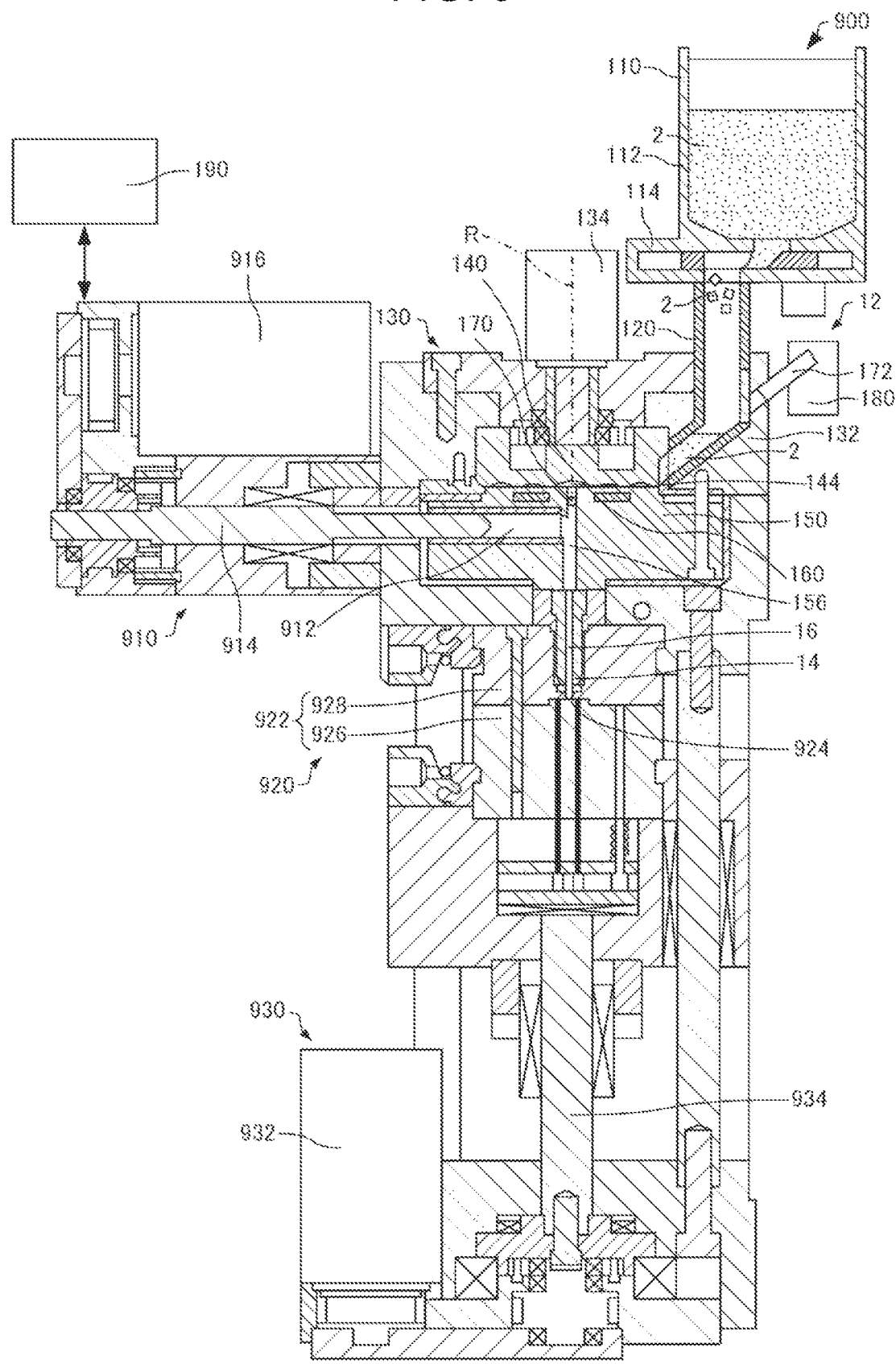
FIG. 9 is a cross-sectional view schematically showing an injection molding device according to the embodiment.

Then, an injection molding device according to the present embodiment will be described with reference to the drawings. FIG. 9 is a cross-sectional view schematically showing an injection molding device 900 according to the present embodiment.

As shown in FIG. 9, the injection molding device 900 includes, for example, the plasticizing device 12 described above. The injection molding device 900 further includes, for example, the nozzle 14, an injection mechanism 910, a mold unit 920, and a mold clamper 930.

The plasticizing device 12 plasticizes the material 2 fed to the first groove 144 of the screw 140 to generate the plasticized material in the paste form having fluidity, and then guides the plasticized material from the communication hole 156 to the injection mechanism 910.

The injection mechanism 910 has, for example, a cylinder 912, a plunger 914, and a plunger driver 916. The cylinder 912 is a member which has a substantially cylindrical shape, and is coupled to the communication hole 156. The plunger 914 moves inside the cylinder 912. The plunger 914 is driven by the plunger driver 916 constituted by a motor, gears, and so on. The plunger driver 916 is controlled by the controller 190.

The injection mechanism 910 slides the plunger 914 inside the cylinder 912 to thereby execute a weighing operation and an injection operation. The weighing operation means an operation of moving the plunger 914 toward a direction of getting away from the communication hole 156 to thereby guide the plasticized material located in the communication hole 156 to the inside of the cylinder 912, and then measuring the weight of the plasticized material inside the cylinder 912. The injection operation means an operation of moving the plunger 914 toward a direction of coming closer to the communication hole 156 to thereby inject the plasticized material located inside the cylinder 912 into the mold unit 920 via the nozzle 14.

The nozzle 14 injects the plasticized material fed from the plasticizing device 12 toward a molding die 922 of the mold unit 920. Specifically, by the weighing operation and the injection operation described above being executed, the plasticized material weighed inside the cylinder 912 is fed from the injection mechanism 910 to the nozzle 14 via the communication hole 156. Further, the plasticized material is injected from the nozzle 14 into the mold unit 920.

The mold unit 920 has the molding die 922. The molding die 922 is a metallic mold. The molding die 922 has a movable mold 926 and a stationary mold 928 opposed to each other, and has a cavity 924 between the movable mold 926 and the stationary mold 928. The plasticized material is injected from the nozzle 14 into the cavity 924 of the molding die 922. The cavity 924 is a space corresponding to a shape of a molded object. The plasticized material flowing into the cavity 924 is cooled to be solidified. Thus, the molded object is formed. The materials of the movable mold 926 and the stationary mold 928 are each metal. It should be noted that the materials of the movable mold 926 and the stationary mold 928 can each be ceramic or resin.

The mold clamper 930 has, for example, a mold driver 932 and a ball screw 934. The mold driver 932 can be constituted by, for example, a motor and gears. The mold driver 932 is coupled to the movable mold 926 via the ball screw 934. The drive by the mold driver 932 is controlled by the controller 190. The ball screw 934 transmits the power of the drive by the mold driver 932 to the movable mold 926. The mold clamper 930 moves the movable mold 926 using the mold driver 932 and the ball screw 934 to thereby perform opening and closing of the mold unit 920.

The embodiment and the modified example described above are illustrative only, and the present disclosure is not limited to the embodiment and the modified example. For example, it is also possible to arbitrarily combine the embodiment and the modified example with each other.

The present disclosure includes configurations substantially the same as the configuration described as the embodiment such as configurations having the same function, the same way, and the same result, or configurations having the same object and the same advantages. Further, the present disclosure includes configurations obtained by replacing a non-essential part of the configuration described as the embodiment. Further, the present disclosure includes configurations exerting the same functional effects and configurations capable of achieving the same object as in the configuration described as the embodiment. Further, the present disclosure includes configurations obtained by adding a known technology to the configuration described as the embodiment.

The following contents derive from the embodiment and the modified example described above.

A plasticizing device according to an aspect includes a material reservoir which has an input port and is configured to retain a material, a plasticizer which has a screw and a case housing the screw and provided with a feed port communicated with the input port, and which is configured to plasticize the material to generate a plasticized material, a coupling pipe having a coupling path configured to connect the input port and the feed port to each other, a material sensor which has a light emitter configured to emit light toward the screw via the feed port, and a light receiver configured to receive reflected light of the light, and which is configured to detect a remaining amount of the material, and a controller configured to control the material reservoir, wherein the material reservoir has a material feed mechanism configured to feed the material to the coupling path, and the controller controls the material feed mechanism to feed the material to the coupling path when the remaining amount of the material detected by the material sensor is smaller than a reference value.

According to the plasticizing device, it is possible to stably plasticize the material.

In the plasticizing device according to the aspect, the screw may be a flat screw having a groove forming surface provided with a groove having a spiral shape, the plasticizer may include a motor configured to rotate the flat screw, and a barrel having an opposed surface opposed to the groove forming surface, and provided with a communication hole into which the plasticized material inflows, a side surface of the flat screw may be provided with a material introduction portion configured to introduce the material to the groove, and the material sensor may detect a remaining amount of the material in the material introduction portion.

According to this plasticizing device, it is possible to reduce the possibility that the material gets stuck in the material introduction portion.

In the plasticizing device according to the aspect, the controller may control the material feed mechanism to feed the material when the controller determines that the remaining amount of the material in the material introduction portion is zero.

According to this plasticizing device, it is possible to further reduce the possibility that the material gets stuck in the material introduction portion.

In the plasticizing device according to the aspect, there may further be included a detection position changer configured to change a detection position by the material sensor, wherein the controller may control the detection position changer so that the material sensor detects the remaining amount of the material in the material introduction portion when the material includes elastomer, and the material sensor detects the remaining amount of the material in the coupling path when the material does not include the elastomer.

According to the plasticizing device, it is possible to prevent the material residue from occurring when the material includes the elastomer, and it is possible to prevent the feeding of the material to the material introduction portion from interrupting when the material does not include the elastomer.

In the plasticizing device according to the aspect, there may further be included a pressure sensor configured to detect pressure in the communication hole, wherein the controller may control a rotational frequency of the flat screw based on a detection value of the pressure sensor.

According to this plasticizing device, it is possible to reduce the variation in amount of the plasticized material passing through the communication hole.

In the plasticizing device according to the aspect, the controller may calculate a phase of the screw at a predetermined time point based on a rotational frequency of the screw, and then correct the remaining amount of the material detected by the material sensor based on the phase of the screw calculated.

According to this plasticizing device, it is possible to obtain a more accurate remaining amount.

In the plasticizing device according to the aspect, the coupling pipe may have a window formed of a transparent material, and the light and reflected light of the light may pass through the window.

According to this plasticizing device, it is possible to dispose the material sensor outside the coupling pipe.

A three-dimensional modeling device according to an aspect includes a plasticizing device configured to plasticize a material to generate a plasticized material, and a nozzle configured to eject the plasticized material fed from the plasticizing device toward a stage, wherein the plasticizing device includes a material reservoir which has an input port and is configured to retain the material, a plasticizer which has a screw and a case housing the screw and provided with a feed port communicated with the input port, and which is configured to plasticize the material to generate the plasticized material, a coupling pipe having a coupling path configured to connect the input port and the feed port to each other, a material sensor which has a light emitter configured to emit light toward the screw via the feed port, and a light receiver configured to receive reflected light of the light, and which is configured to detect a remaining amount of the material, and a controller configured to control the material reservoir, wherein the material reservoir has a material feed mechanism configured to feed the material to the coupling path, and the controller controls the material feed mechanism to feed the material to the coupling path when the remaining amount of the material detected by the material sensor is smaller than a reference value.

An injection molding device according to an aspect includes a plasticizing device configured to plasticize a material to generate a plasticized material, and a nozzle configured to inject the plasticized material fed from the plasticizing device toward a molding die, wherein the plasticizing device includes a material reservoir which has an input port and is configured to retain the material, a plasticizer which has a screw and a case housing the screw and provided with a feed port communicated with the input port, and which is configured to plasticize the material to generate the plasticized material, a coupling pipe having a coupling path configured to connect the input port and the feed port to each other, a material sensor which has a light emitter configured to emit light toward the screw via the feed port, and a light receiver configured to receive reflected light of the light, and which is configured to detect a remaining amount of the material, and a controller configured to control the material reservoir, wherein the material reservoir has a material feed mechanism configured to feed the material to the coupling path, and the controller controls the material feed mechanism to feed the material to the coupling path when the remaining amount of the material detected by the material sensor is smaller than a reference value.

What is claimed is:

1. A plasticizing device comprising:
   a material reservoir which has an input port and is configured to retain a material;
   a plasticizer which has a screw and a case housing the screw and provided with a feed port communicated with the input port, and which is configured to plasticize the material to generate a plasticized material;
   a coupling pipe having a coupling path configured to connect the input port and the feed port to each other;
   a material sensor which has a light emitter configured to emit light toward the screw via the feed port, and a light receiver configured to receive reflected light of the light, and which is configured to detect a remaining amount of the material; and
   a controller configured to control the material reservoir, wherein
   the material reservoir has a material feed mechanism configured to feed the material to the coupling path,
   the controller is configured to control the material feed mechanism to feed the material to the coupling path when the remaining amount of the material detected by the material sensor is smaller than a reference value,
   the screw is a flat screw having a groove forming surface provided with a groove having a spiral shape,
   the plasticizer includes
      a motor configured to rotate the flat screw, and
      a barrel having an opposed surface opposed to the groove forming surface, and provided with a communication hole into which the plasticized material inflows,
   a side surface of the flat screw is provided with a material introduction portion configured to introduce the material to the groove, and
   the material sensor detects the remaining amount of the material in the material introduction portion,
   and further comprising a detection position chancier configured to change a detection position by the material sensor, wherein the controller is configured to control the detection position changer so that the material sensor detects the remaining amount of the material in the material introduction portion when the material includes elastomer, and the material sensor detects the remaining amount of the material in the coupling path when the material does not include the elastomer.

2. The plasticizing device according to claim 1, wherein the controller controls the material feed mechanism to feed the material when the controller determines that the remaining amount of the material in the material introduction portion is zero.

3. The plasticizing device according to claim 1, further comprising:
   a pressure sensor configured to detect pressure in the communication hole, wherein
   the controller controls a rotational frequency of the flat screw based on a detection value of the pressure sensor.

4. The plasticizing device according to claim 1, wherein the controller calculates a phase of the screw at a predetermined time point based on a rotational frequency of the screw, and then corrects the remaining amount of the material detected by the material sensor based on the phase of the screw calculated.

5. The plasticizing device according to claim 1, wherein the coupling pipe has a window formed of a transparent material, and
   the light and reflected light of the light pass through the window.

6. A three-dimensional modeling device comprising:
   a plasticizing device configured to plasticize a material to generate a plasticized material; and
   a nozzle configured to eject the plasticized material fed from the plasticizing device toward a stage, wherein
   the plasticizing device includes
      a material reservoir which has an input port and is configured to retain the material,
      a plasticizer which has a screw and a case housing the screw and provided with a feed port communicated with the input port, and which is configured to plasticize the material to generate the plasticized material,
      a coupling pipe having a coupling path configured to connect the input port and the feed port to each other,
      a material sensor which has a light emitter configured to emit light toward the screw via the feed port, and a light receiver configured to receive reflected light of the light, and which is configured to detect a remaining amount of the material, and
      a controller configured to control the material reservoir,
   the material reservoir has a material feed mechanism configured to feed the material to the coupling path, and
   the controller is configured to control the material feed mechanism to feed the material to the coupling path when the remaining amount of the material detected by the material sensor is smaller than a reference value,
   the screw is a flat screw having a groove forming surface provided with a groove having a spiral shape,
   the plasticizer includes
      a motor configured to rotate the flat screw, and
      a barrel having an opposed surface opposed to the groove forming surface, and provided with a communication hole into which the plasticized material inflows,
   a side surface of the flat screw is provided with a material introduction portion configured to introduce the material to the groove, and the material sensor detects the remaining amount of the material in the material introduction portion, and further comprising a detection position chancier configured to change a detection position by the material sensor, wherein the controller is configured to control the detection position changer so that the material sensor detects the remaining amount of the material in the material introduction portion when the material includes elastomer, and the material sensor detects the remaining amount of the material in the coupling path when the material does not include the elastomer.

7. An injection molding device comprising:

a plasticizing device configured to plasticize a material to generate a plasticized material; and a nozzle configured to inject the plasticized material fed from the plasticizing device toward a molding die, wherein the plasticizing device includes
- a material reservoir which has an input port and is configured to retain the material,
- a plasticizer which has a screw and a case housing the screw and provided with a feed port communicated with the input port, and which is configured to plasticize the material to generate the plasticized material,
- a coupling pipe having a coupling path configured to connect the input port and the feed port to each other,
- a material sensor which has a light emitter configured to emit light toward the screw via the feed port, and a light receiver configured to receive reflected light of the light, and which is configured to detect a remaining amount of the material, and
- a controller configured to control the material reservoir, the material reservoir has a material feed mechanism configured to feed the material to the coupling path, and the controller is configured to control the material feed mechanism to feed the material to the coupling path when the remaining amount of the material detected by the material sensor is smaller than a reference value, the screw is a flat screw having a groove forming surface provided with a groove having a spiral shape, the plasticizer includes
- a motor configured to rotate the flat screw, and
- a barrel having an opposed surface opposed to the groove forming surface, and provided with a communication hole into which the plasticized material inflows, a side surface of the flat screw is provided with a material introduction portion configured to introduce the material to the groove, and the material sensor detects the remaining amount of the material in the material introduction portion, and further comprising a detection position chancier configured to change a detection position by the material sensor, wherein the controller is configured to control the detection position changer so that the material sensor detects the remaining amount of the material in the material introduction portion when the material includes elastomer, and the material sensor detects the remaining amount of the material in the coupling path when the material does not include the elastomer.

* * * * *